United States Patent [19]

Pollard

[11] 3,863,134

[45] Jan. 28, 1975

[54] ELECTRIC CONTROL CIRCUITS FOR A STATIC POWER CONVERTER

[75] Inventor: Ernest M. Pollard, Cherry Hill, N.J.

[73] Assignee: General Electric Company, Philadelphia, Pa.

[22] Filed: July 23, 1973

[21] Appl. No.: 382,015

[52] U.S. Cl. .................................. 321/5, 321/40
[51] Int. Cl. ............................................ H02m 7/20
[58] Field of Search ........ 321/5, 16, 18, 27 R, 69 R, 321/38, 40

[56] References Cited
UNITED STATES PATENTS

| | | | |
|---|---|---|---|
| 2,832,029 | 4/1958 | Forssell | 321/16 X |
| 3,551,778 | 12/1970 | Ekstrom | 321/18 X |
| 3,701,938 | 10/1972 | Chadwick | 321/5 X |
| 3,737,763 | 6/1973 | Chadwick | 321/5 X |
| 3,771,041 | 11/1973 | Chadwick | 321/5 |

Primary Examiner—R. N. Envall, Jr.
Attorney, Agent, or Firm—Albert S. Richardson, Jr.; J. Wesley Haubner

[57] ABSTRACT

Improved means is provided for determining the firing angle at which the respective valves of an electric power converter are sequentially fired. The valves have firing means which are activated in turn by a family of firing signals which are periodically generated at equal intervals and in synchronism with the alternating voltage of the a-c system to which the converter is connected. The firing signal generator, which normally runs at a constant frequency synchronized with the alternating voltage and produces firing signals having a constant firing angle $\beta$, responds to a variable bipolar control signal by changing $\beta$ at a rate that depends on the control signal magnitude and in a sense that depends on its polarity. A beta monitor is provided for producing an angle feedback signal whose magnitude is representative of $\beta$, and an overriding clamp influences the control signal as a function of any deviation of the angle feedback signal above a preset maximum limit or below a preset minimum limit so as to minimize any excursion of $\beta$ outside a permissible range which is established by these minimum and maximum limits.

19 Claims, 7 Drawing Figures

ELECTRIC CONTROL CIRCUITS FOR A STATIC POWER CONVERTER

This invention relates to firing signal generators for controlling the electric valves of static power converters, and more particularly it relates to improved means for determining the firing angle of the valves of a high-voltage converter of the kind that can be operated alternatively in either a rectifying mode (converting a-c to d-c) or an inverting mode (converting d-c to a-c) in an HVDC electric power delivery system.

A static power converter suitable for HVDC power delivery systems comprises the combination of a polyphase power transformer and at least one group of six interconnected current valves. Each of the valves can be a single mercury arc tube, or a plurality of semiconductor cells such as thyristers that are operated in unison. Typically the valves are arranged in 3-phase double-way 6-pulse bridge configurations having three separate a-c terminals and a pair of positive and negative d-c terminals. By sequentially firing the respective valves in the proper order and in synchronism with the sinusoidal alternating voltage of the 3-phase electric power network to which the a-c terminals of the bridge are connected, the flow of power between the a-c and d-c terminals can be controlled as desired.

The time at which a valve is fired, measured in electrical degrees from a recurrent reference point in each cycle of the associated voltage, is known as the "firing angle." It can be expressed either as an angle of delay ("alpha") after the positive-going zero crossing of the anode voltage of the valve, or as the complementary angle of advance ("beta") prior to the cyclically recurring instant at which the anode voltage waveform would have crossed zero and gone negative relative to the cathode if the valve had not been fired. Hereinafter the firing angle will be referenced to the latter instance, it being understood that a beta of $\beta$ degrees corresponds to a delay angle of $180° - \beta$. When beta is $180°$, alpha is zero and the average magnitude of the rectified voltage between the d-c terminals of the converter has its maximum positive level. As beta is decreased from $180°$ to approximately $90°$, the average d-c voltage decreases to zero. For betas in the range of $90°$ to zero, the average d-c voltage reverses polarity (i.e., the potential on the nominal positive terminal is relatively negative), and the bridge operates in its inverting mode whereby power can be transmitted from the d-c to the a-c terminals.

To fire an individual valve, its control grid or gate has to be activated by an appropriate trigger signal or gate pulse which is periodically applied thereto. A converter will therefore include suitable means for cyclically producing a series of gate pulses to fire the respective valves in the proper sequence and in synchronism with the alternating voltage of the a-c network. Ordinarily the control means comprises a firing signal generator whose operation determines the timing of the gate pulses and hence the firing angle of the valves. The firing signal generator performs the function of a firing time computer. In accordance with common practice in the art, the control means is also provided with firing angle limits or stops so that $\beta$ cannot be less than a certain MIN angle (which is large enough to ensure that the "margin angle" of the relieved valve is adequate for safe commutation whenever the converter is operating in its inverting mode) or more than a certain MAX angle (which is small enough to ensure sufficient forward anode voltage across a valve for safe turn-on whenever the converter is operating in its rectifying mode).

In designing firing signal generators for HVDC converters, the importance of equal intervals between consecutive valve firings is generally recognized. This criterion minimizes generation or magnification of abnormal harmonics and permits continued operation under conditions of severely distorted voltage waveforms in the a-c network. Consequently persons skilled in the art have favored the use of voltage-controlled oscillators in firing signal generators for HVDC converters, rather than the individual phase control approaches that have been popular in industrial rectifiers and the like. Examples of firing signal generators using voltage-controlled oscillators will be found in U.S. Pat. Nos. 2,467,765-Mayle, 3,047,789-Lowery, and 3,197,691-Gilbert. The reasons this approach is preferable in controls for HVDC converters are explained in a paper entitled "The Phase-Locked Oscillator — A New Control System for Controlled Static Converters" by J. D. Ainsworth, IEEE Transactions on Power Apparatus and Systems, Vol. PAS-87, No. 3, March 1968, pages 859–65. In steady-state operation the voltage-controlled oscillator runs at a predetermined constant frequency, which is six or 12 times the normal frequency of the a-c network, to drive a multiple (e.g., 6 or 12) stage ring counter, shift register or the like which in turn generates a family of equidistantly spaced signals for cyclically firing the respective valves of the converter at precisely equal intervals and at the proper firing angle $\beta$ to maintain equality between the actual and the desired magnitudes of a selected quantity of the system. In the event of a change in the response or the order, an associated regulator will supply a proportionate error voltage which transiently varies the frequency of the oscillator, and as a result $\beta$ shifts in a corrective sense until the error is reduced to zero, whereupon the aforesaid constant-frequency oscillations resume.

To provide the requisite firing angle limits or stops, Ainsworth has disclosed in his U.S. Pat. No. 3,466,525 a scheme for blocking the firing of each valve in advance of a first predetermined angle ($\beta_{MAX}$) even though the oscillator earlier changed states in an attempt to fire that valve, and for enforcing a valve firing at a second predetermined angle ($\beta_{MIN}$) if the oscillator fails before then to initiate the corresponding firing signal. These firing angle limits are separately determined for each of the valves. "Hard" limits of this kind have certain shortcomings in HVDC converter controls. Since they are affected by parameters associated with the individual valves, the benefits of equal intervals between consecutive firings may be lost if the firing angle reaches a limit established by one of the valves while remaining within the permissible range of firing angles as determined by the parameters of another valve. Furthermore, when operating against a limit there is no assurance that the oscillator disclosed by Ainsworth is running at its predetermined constant frequency or that its oscillations, if synchronized with the alternating voltage of the a-c network, are properly phased with respect thereto for initiating valve firings at a firing angle equal to that limit. Another problem with the prior art scheme is the difficulty of varying the present maximum and/or minimum limits in response to certain system disturbances or in accordance with a prearranged program.

Accordingly, it is a general objective of my invention to provide a firing signal generator that does not have the shortcomings of prior art schemes.

Another object of the invention is to provide an improved firing signal generator that is characterized by its high speed and accurate response to system disturbances and by its unusual versatility.

In carrying out my invention in one form, an alternating voltage power system and a set of d-c power conductors are interconnected by a static converter comprising a plurality of intermittently conducting electric valves which are sequentially fired in response to a family or periodic firing signals. During each cycle of alternating voltage the respective firing signals in turn are generated at substantially equal intervals in response to successive oscillations of a voltage-controlled oscillator whose frequency depends on the magnitude and the polarity of a variable, bipolar control signal. The firing signals are characterized by a firing angle $\beta$ whose magnitude will be constant so long as the control signal is zero. If and when the control signal is other than zero, the oscillator responds by changing $\beta$ at a rate that depends on the control signal magnitude and in a sense that depends on its polarity. I provide means for continuously monitoring $\beta$ and means for comparing it with preset maximum and minimum limits. The latter means provides an overriding clamp on the control signal. As soon as $\beta$ reaches a limit, the clamp influences the control signal so as lock the oscillator frequency to the system frequency, thereby effectively preventing or minimizing excursion of $\beta$ beyond said limit. Any overshoot is rapidly corrected because the degree of influence on the control signal is proportional to the excursion. The consecutive firing signals continue to be generated at the desired equal intervals.

In one aspect of my invention, the control signal is derived from a bipolar error signal which depends on the difference between actual and desired magnitudes of a selected quantity of the converter or the power system, and the frequency of the oscillator is determined by the sum of the control signal and a bias signal whose magnitude causes the oscillator to operate in synchronism with the normal fundamental frequency of the alternating voltage. I provide additional means for adding to the error signal a compensating signal of proper value to ensure that so long as the error signal is zero the oscillator will run in synchronism with the alternating voltage even if the fundamental frequency of the latter were different than normal.

In yet another aspect of my invention, the aforesaid error signal depends on the difference between the actual magnitude of $\beta$ as determined by the aforesaid monitoring means and a desired angle which is established by the aforesaid preset maximum limit.

My invention will be better understood and its various objects and advantages will be more fully appreciated from the following description taken in conjunction with the accompanying drawings in which.

Figure 1:
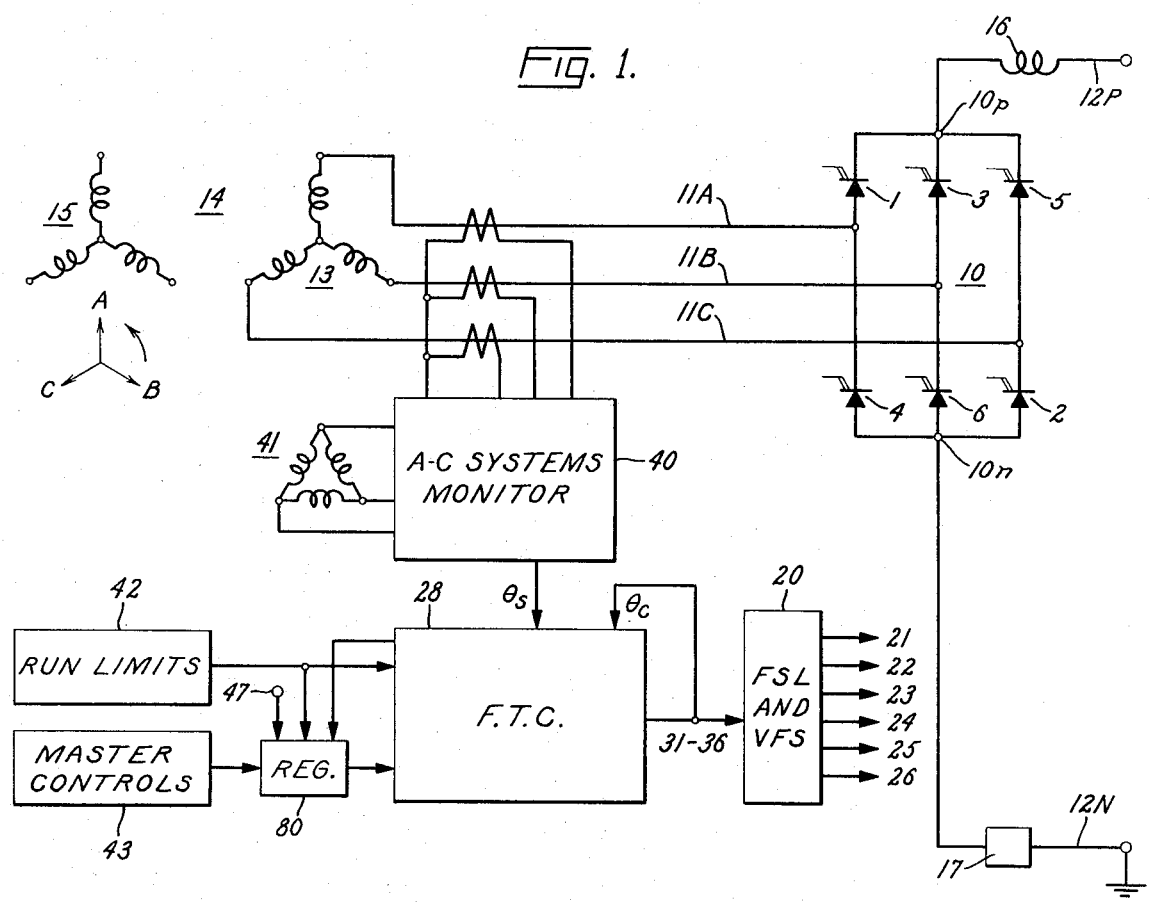
FIG. 1 is a functional block diagram of a static power converter having controls that embody my invention.

Referring now to FIG. 1, the illustrated converter is seen to comprise a group of six controllable electric valves 1, 2, 3, 4, 5, and 6 which are interconnected and arranged to form a 6-pulse bridge 10 between a set of three separate a-c power conductors 11A, 11B, and 11C and a set of two d-c power conductors 12P and 12N. The a-c conductors are in turn connected to a set 13 of star-connected secondary windings of a main power transformer 14 whose 3-phase primary 15 is adapted to be connected to the respective phases of a polyphase a-c electric power network (not shown) whose phase rotation is A, B, C. The bridge 10 has a nominal positive terminal 10p which is connected to the first d-c conductor 12P by way of a conventional current smoothing reactor or choke 16, and a nominal negative terminal 10n which is connected to the other d-conductor 12N either directly or, more commonly, via the d-c terminals of at least one additional 6-pulse bridge connected in series with the bridge 10. In FIG. 1 the block 17 represents the companion bridges, and it will be understood that their a-c terminals are ordinarily connected to separate power transformers or to additional sets of 3-phase secondary windings inductively coupled to the primary 15 of the illustrated transformer 14. To form a 12-pulse converter, for example, a total of two bridges and two sets of secondary windings can be used, with the second set having its windings connected in delta so that its voltages are displaced in phase by 30 electrical degrees from the voltages on conductors 11A, 11B, and 11C, respectively.

The converter that is shown in FIG. 1 is intended to be part of one pole of a terminal or station of a power delivery system which can transmit high voltage direct current (HVDC) over the conductors 12P and 12N between the a-c network to which the transformer primary 15 is connected and another network to which the remote ends of these d-c conductors are coupled. Ordinarily there is another converter terminal (not shown) located between the remote end of the d-c link and the other a-c network. In this setting each of the six controlled valves in each bridge of the system must necessarily be capable of periodically blocking high voltages and conducting high currents. Toward that end, each valve preferably comprises a series string of parallel arrays of individual thyristors which are suitably arranged for switching and conducting effectively in unison. See for example U.S. Pat. No. 3,423,664-Dewey. Each of the constituent thyristors of a valve has its own gating means, and in order to turn on or to fire the valve suitable means is provided for simultaneously activating the gating means of all of its thyristors in response to a trigger signal being applied to the valve by associated controls.

The controls for the bridge 10 include a valve firing system 20 which repetitively produces a series of appropriate trigger signals 21–26 and which sequentially applies these signals to the six valves 1–6 in numbered order. In FIG. 1 the valve firing system 20 is illustrated as a single block that is intended also to include a firing signal logic function. The valve firing system 20 is suitably designed to produce the trigger signals 21–26 in turn when activated by periodic output signals of a firing time computer 28. The firing time computer 28, during each cycle of the transformer secondary voltages, generates and distributes to the valve firing system a family of six staggered output pulses 31–36 (herein referred to as firing signals). The individual firing signals respectively commence at intervals of 60 electrical degrees, and it is their timing relative to the zero crossings of the alternating voltages on the conductors 11A, 11B, and 11C that determines the firing angle of the valves 1–6. By varying this firing angle, the direction and amount of power flowing between the a-c and the d-c conductors can be controlled in a known manner.

As will soon be more fully explained, the firing time computer 28 is suitably constructed and arranged to vary within prescribed limits, the timing of the family of firing signals relative to the zero crossings of the alternating voltages so that the actual direction and quantity of power will conform to a given power order. Toward this end, operation of the firing time computer 28 is affected by several interdependent inputs. As is shown in FIG. 1, one of the inputs is a periodic feedback signal $\theta_c$ which marks the initiation of successive valve firings in the bridge 10. Another input is a periodic reference signal $\theta_s$ which is synchronized with the fundamental sinusoidal voltage waveform of the a-c system. This reference signal is derived from the a-c network by means of an a-c system monitor 40 which is coupled to the power conductors 11A, 11B and 11C by suitable means such as tertiary windings 41 of the main 3-phase power transformer 14. Other inputs to the firing time computer are supplied by a block 42 labeled "run limits" and by a regulator 80 which in turn receives power orders from the master controls 43 and system responses from a feedback terminal 47. It should be noted that in a 12-pulse converter the companion bridge 17 can either share the same firing time computer with the bridge 10 as is more fully explained below in conjunction with the description of FIG. 3, or have its own separate controls, in which case the firing time computers associated with the two bridges could be suitably arranged to operate either independently or in concert with one another.

Figure 2:
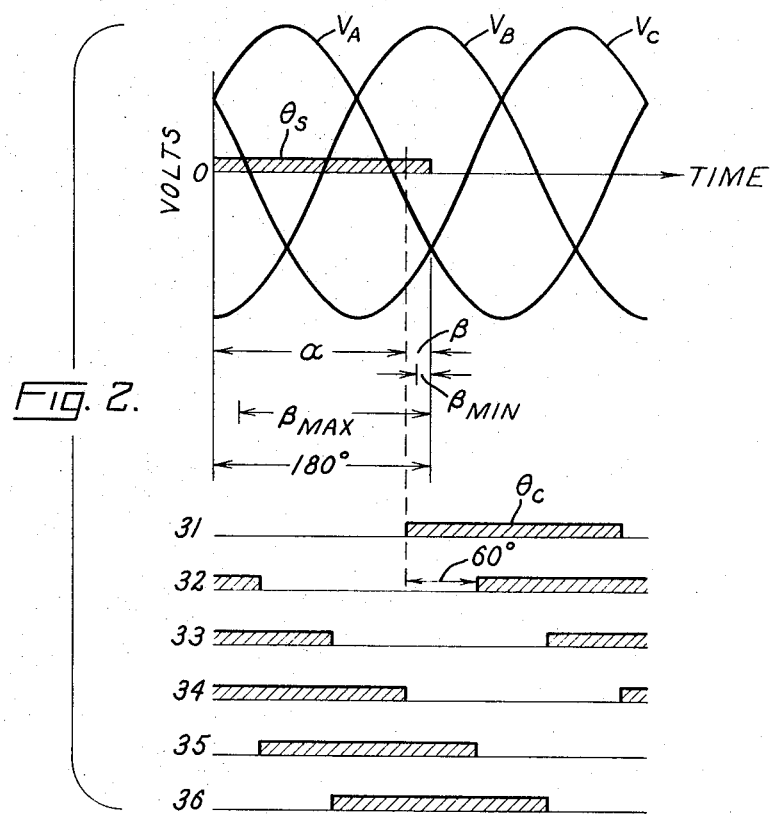
FIG. 2 is a simplified diagram of the wave forms of the alternating voltages of the transformer secondary windings of the converter showing FIG. 1.

The timing of the family of periodic firing signals that the firing time computer 28 generates is characterized by the variable electric angle $\beta$. This is best seen in FIG. 2 which depicts for one complete cycle the sinusoidal waveforms for the fundamental components $V_A$, $V_B$, and $V_C$ of the alternating voltages on the three a-c conductors 11A, 11B, and 11C, respectively. Commutating notches and other harmonic distortions have been neglected in FIG. 2 for the sake of simplicity. Successive zero crossings of the voltages $V_A$, $V_B$, and $V_C$ serve as recurrent reference points for the firing signals in the illustrated cycle. In FIG. 2 there is shown the family of six consecutive firing signals 31 through 36 which respectively initiate firings of the valves 1–6 in numbered sequence. Under steady state conditions the frequency of each firing signal is equal to the fundamental frequency of the alternating voltage (e.g., 60 Hz), and the interval or spacing between the leading edges of any two consecutive firing signals is precisely 60° as shown.

The angle $\beta$ of the firing signal 31 for valve 1 is referenced to the negative-going zero crossing of the forward anode voltage ($V_A$-$V_C$) across this valve prior to firing. Since valve 5 is relieved when valve 1 is fired, this voltage is also known as the commutating voltage of valve 5. Both the periodic reference signal $\theta_s$ and the feedback signal $\theta_c$ which are associated with valve 1 have been indicated in FIG. 2. The former coincides with the positive half cycles of the phase A to phase C voltage of the a-c network, and the latter coincides with the firing signal 31. It will be observed that the length of overlap of these reference and feedback signals is a measure of $\beta$. Preset lower and upper limits between which $\beta$ is permitted to vary are also illustrated in FIG. 2. With the particular $\beta$ shown in this figure, the converter will be operating in its inverting mode; if the angle were advanced (increased) to nearly its upper limit ($\beta_{MAX}$), rectifier operation would result. It should be noted that the upper limit of beta corresponds to a lower limit ($\alpha_{MIN}$) of the delay angle alpha.

Figure 3:
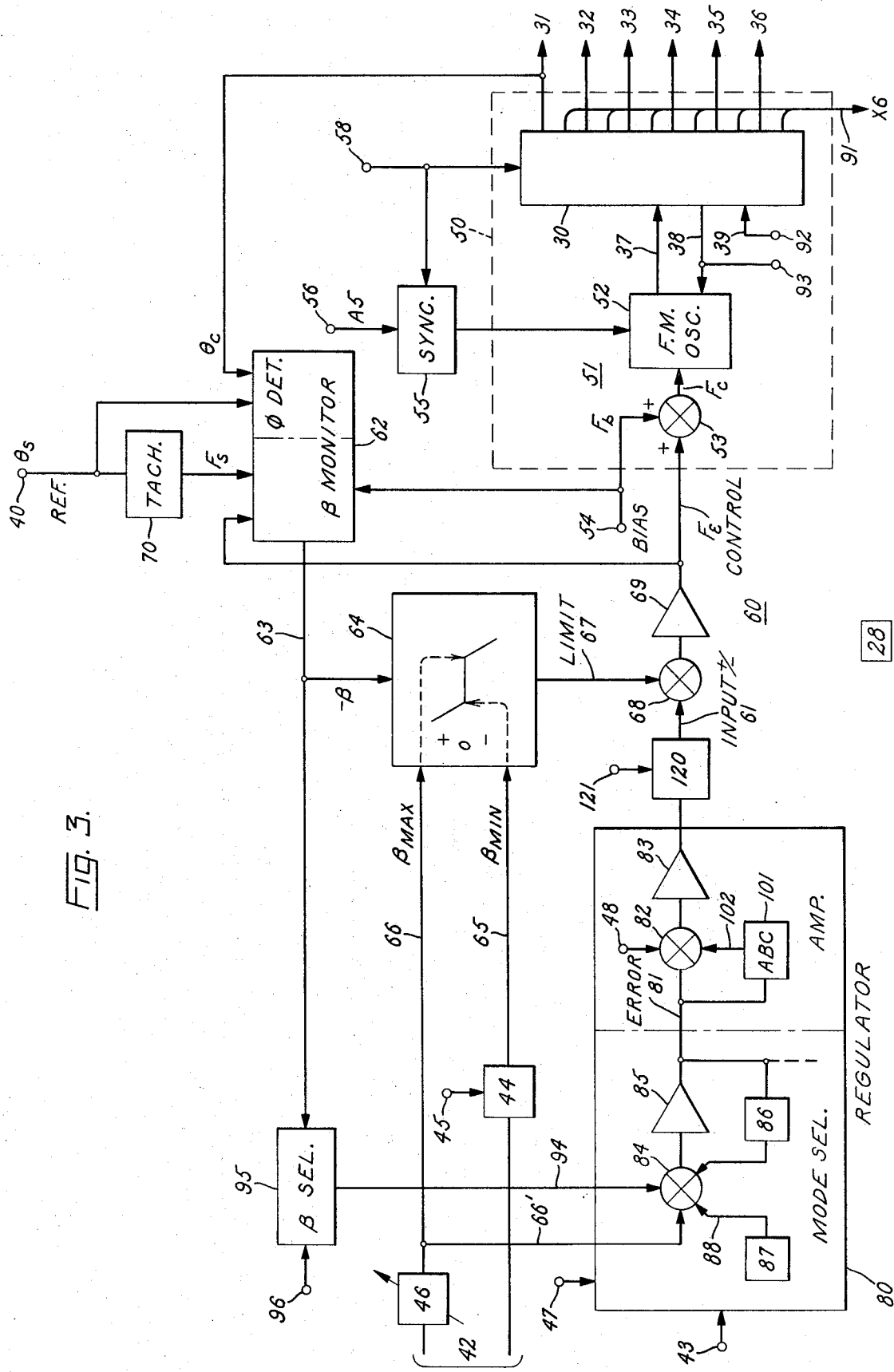
FIG. 3 is an expanded schematic diagram of the regulator and the firing signal generator comprising the firing time computer shown in block form in FIG. 1.

The details of my improved firing time computer 28 will now be described with reference to FIG. 3 which schematically illustrates a preferred embodiment of the invention. As can be seen in FIG. 3, the firing time computer comprises a signal generator 50 which is controlled by a varible bipolar control signal $F_\epsilon$, and means 60 for deriving the control signal from a bipolar input signal 61 whose source is the regulator 80 which varies the input signal in accordance with the difference between actual and desired magnitudes of a selected system quantity.

The signal generator 50 comprises the combination of a voltage controlled oscillator 51 and a distributor 30. The voltage controlled oscillator in turn comprises a frequency modulated clock 52 whose operating frequency varies with the magnitude of a frequency determining voltage $F_c$, and means 53 for deriving $F_c$ from the algebraic sum of the control signal $F_\epsilon$ and a bias signal $F_b$ of preselected magnitude. The oscillator has an integrating characteristic; the time interval it requires after being periodically recycled before producing its next output pulse is determined by the magnitude of $F_c$. The bias signal $F_b$, which is taken from a terminal 54, is appropriately dimensioned to cause the voltage $F_c$ to have the proper magnitude whenever the control signal is zero to cause the oscillator to run at a predetermined harmonic (e.g., twelfth) of the normal fundamental frequency (e.g., 60 Hz) of the alternating voltage of the a-c network. Thus in steady state operation the oscillator 51 produces a train 37 of equidistant, discrete pulses whose frequency is a predetermined multiple of the a-c system frequency.

The distributor 30 responds to the pulse train 37 by sequentially issuing at 60° intervals the periodic firing signals 31–36 which activate in turn the previously described valve firing system 20. Concurrently with the commencement of each firing signal, the distributor 30 issues a feedback signal 38 which resets or clears the clock 52 in the voltage controlled oscillator 51, whereupon the oscillator immediately starts its next cycle of operation. Sixty degrees after initiating the sixth firing signal 36, the distributor repeats the first firing signal 31. In this manner the firing signal for each valve in the bridge 10 is cyclically generated at a frequency determined by the magnitude of $F_c$. Consequently $F_c$ is proportional to the frequency of the respective valve firings. When $F_c = F_b$, the oscillator frequency is "normal" and the angle $\beta$ of the firing signals is constant. If $F_\epsilon$ has a finate positive magnitude, $F_c$ increases by that magnitude and proportionately increases the oscillator frequency above normal. Since the spacing between leading edges of consecutive firing signals is now shorter than 60° (system basis), $\beta$ is incrementally advanced each cycle of the higher frequency. Conversely, if $F_\epsilon$ has a finite negative magnitude, $F_c$ decreases and proportionately reduces the frequency below normal which incrementally retards $\beta$ each cycle of the lower frequency. The longer the oscillator runs at a given higher or lower frequency, or the greater the frequency deviation for a given length of time, the greater is the cumulative change of $\beta$.

The arrangement illustrated in FIG. 3 has been designed for a 12-pulse converter wherein the normal operating frequency of the oscillator 51 is 12 times the fundamental frequency of the system and the distributor 30 generates two families of interleaved firing signals. A second family of six firing signals, phase displaced by 30° with respect to the family 31-36, is indicated at 91 and is fed to a valve firing system (not shown) associated with the companion bridge 17. Preferably the controls include redundant voltage controlled oscillators whose pulse trains 39 are supplied via a terminal 92 to a suitable voting logic circuit in the distributor 30 and whose clocks are reset by the feedback signals 38 which are coupled thereto by a terminal 93.

While other suitable known circuits can be used for constructing the signal generator 50, in practice I prefer an arrangement wherein synchronizing means 55 is provided to ensure that each time the converter is started the initial firing signal to be generated is properly timed in relation to the anode voltage of the corresponding valve. Inputs to this synchronizing means comprise a timing signal A5 which the a-c system monitor 40 (FIG. 1) periodically supplies to a terminal 56, and a predetermined start command supplied by external controls to a terminal 58. The start command also supervises operation of the distributor 30.

In accordance with my present invention, the means 60 for deriving the control signal $F_\epsilon$ from the input signal 61 comprises a beta monitor 62 for producing an angle feedback signal 63 whose magnitude is representative of $\beta$, an overriding clamp 64 for comparing the angle feedback signal 63 with preset minimum and maximum limits 65 and 66, respectively, and for supplying a limit signal 67 proportional in magnitude to the amount of any deviation of $\beta$ outside a range of permissible variations that these limits establish, and means 68 for algebraically summing the input signal 61 and the limit signal 67. The output of the summing means 68 is connected to a non-inverting, unity gain amplifier 60 whose output is representative of the sum of the signals 61 and 67 and is the control signal $F_\epsilon$.

Preferably the beta monitor 62 used in practicing my invention is suitably constructed and arranged to produce an angle feedback signal whose magnitude varies with the predicted magnitude of $\beta$ for each consecutive firing signal that will in turn effect the next valve firing in numerical sequence. For this purpose the monitor that is the subject matter of my concurrently filed U.S. patent application Ser. No. 382,016 is well suited. Such a monitor utilizes the inputs indicated schematically in FIG. 3 and responds thereto with both high steady-state accuracy and fast transient response to produce an angle feedback signal having relatively negative polarity and a magnitude that is a measure of $\beta$. The input signal $F_s$ is proportional to the fundamental frequency of the a-c network, and it is derived from the reference signal $\theta_s$ by an electronic tachometer 70.

Figure 4:
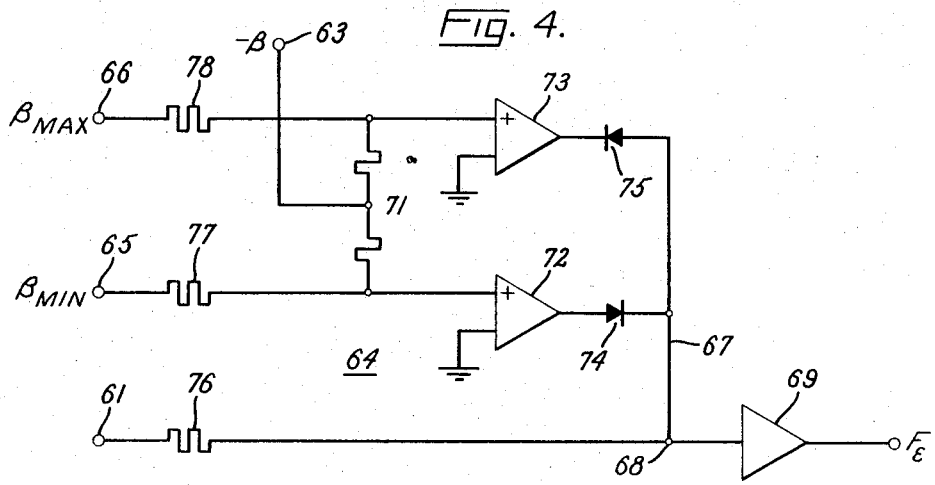
FIG. 4 is a schematic circuit diagram of the overriding clamp shown as a single block in FIG. 3.

The clamp 64 responds to the angle feedback signal 63 and influences the control signal $F_\epsilon$ as a function of any deviation of 63 beyond the respective minimum and maximum limits 65 and 66. The circuit shown in FIG. 4 is useful for this purpose. The relatively negative signal 63 ($-\beta$) is coupled to the midpoint of a voltage divider 71. One end of the divider 71 is connected to the non-inverting input of an op amp 72, and the other end is connected to the corresponding input of another op amp 73. The outputs of the op amps 72 and 73 are connected to the summing point 68 by way of diodes 74 and 75, respectively, with diode 74 being poled to contribute current to the summing point and diode 75 bieng poled to drain current away from this point. The input signal 61 is applied to the summing point 68 through an input resistor 76. The minimum limit 65 ($\beta_{MIN}$) is fed through a resistor 77 to the input of the op amp 72, and the maximum limit 66 ($\beta_{MAX}$) is fed through a resistor 78 to the input of the op amp 73. So long as the magnitude of the angle feedback signal 63 is greater than a certain level set by the minimum limit 65 but less than a higher magnitide set by the maximum limit 66, the net input to op amp 72 is negative with respect to ground, the net input to the op amp 73 is positive with respect to ground, both of the diodes 74 and 75 are blocking, and the magnitude of the limit signal 67 is zero. Any deviation of 63 above the preset MAX results in a relatively negative net input to the op amp 73, in which case the diode 75 becomes forward biased and the summing point 68 sees an amplified negative limit signal 67 whose magnitude is proportional to the amount by which 63 exceeds the maximum limit. Any deviation of 63 below the preset MIN results in a relatively positive net input to the op amp 72, whereupon the diode 74 will be forward biased and the summing point 68 sees an amplified positive limit signal 67 whose magnitude is proportional to the amount by which 63 falls below the minimum limit.

The preset MAX and MIN limits of $\beta$ are determined by the external run limits 42. Ordinarily $\beta_{MAX}$ is set in the vicinity of 171° to 173°, and $\beta_{MIN}$ is set in the vicinity of 15° to 18°. These limits keep the timing of the firing signals within proper bounds prior to starting the converter and ensure that $\beta$ does not slip outside these bounds at any time, whether the converter is actually transmitting electric power or not, yet they do not interfere with the normal regulation of the converter when running. However, there are some circumstances, including the advent of certain system disturbances, when variations or changes in the preset limits are desired so as to override normal regulator action. As is shown in FIG. 3, the $\beta_{MIN}$ circuit is provided with means 44 for quickly increasing the value of the minimum limit 65 according to the magnitude of a signal applied to a terminal 45 by associated means (not shown) in response to a severe reduction in commutating voltage, as is taught in U.S. patent No. 3,737,763 granted to P. Chadwick and assigned to the General Electric Co. The $\beta_{MAX}$ circuit includes suitable control circuit means 46 which can be effective during certain a-c system disturbances for decreasing the maximum limit 66 according to the teachings of another U.S. patent application Ser. No. 170,081 filed for P. Chadwick on Aug. 9, 1971, and assigned to the General Electric Co. (now U.S. Pat. No. 3,701,938).

When a limit signal 67 is produced by the clamp 64, it influences the control signal $F_\epsilon$ in the sense that regulates the operation of the signal generator 50 as necessary to minimize the excursion of $\beta$ outside its permissible range. For example, if $\beta$ were too low the resulting positive limit signal 67 would proportionately increase the control signal by the proper amount to momentarily accelerate the voltage controlled oscillator 51 so that $\beta$ advances to the correct inrange angle, whereupon the limit signal returns to zero and no longer modifies the control signal.

Figure 6:
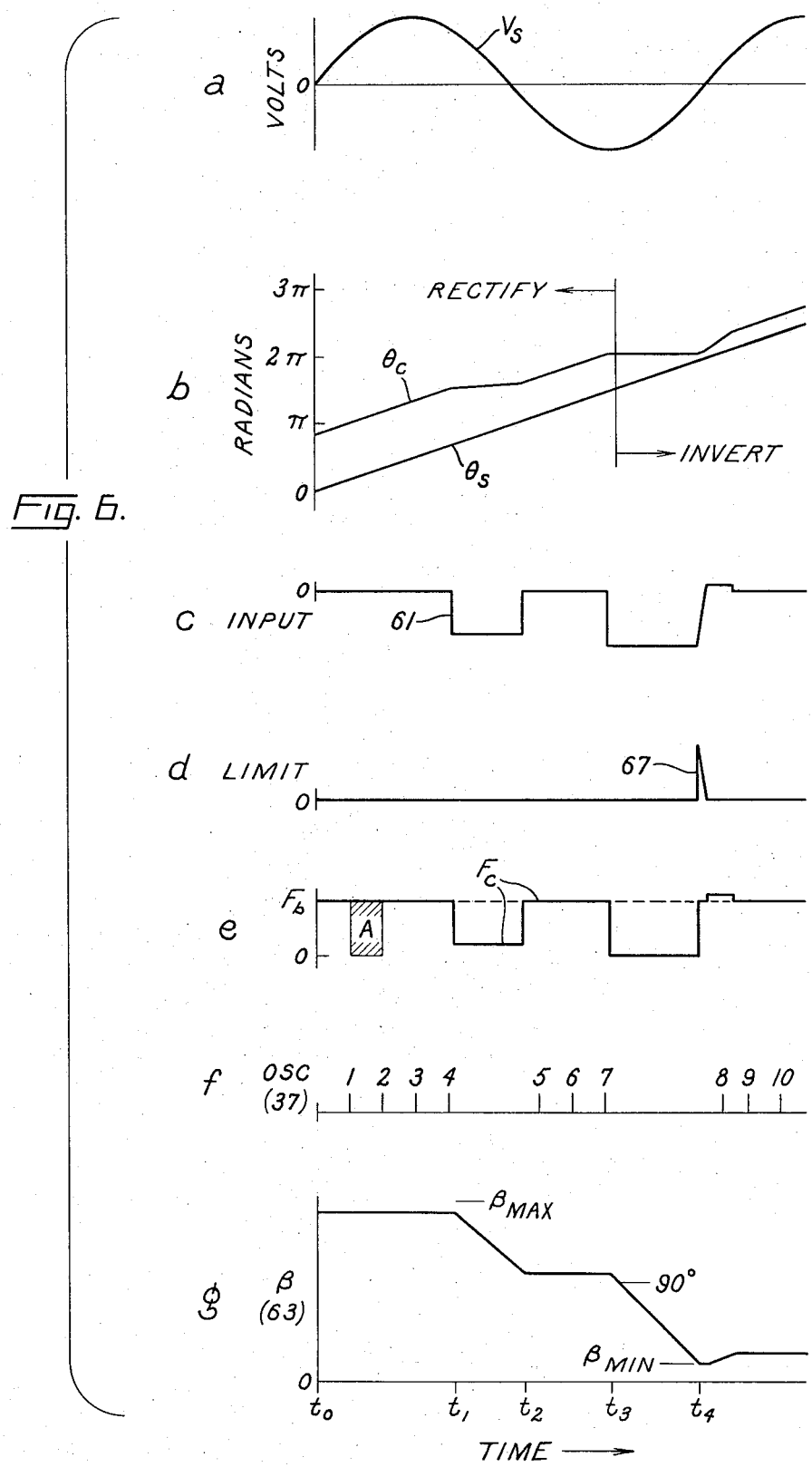
FIG. 6 is a series of charts showing certain electrical quantities and parameters plotted against time to illustrate the manner of operation of my invention.

The operation of the signal generator 50 and the control signal deriving means 60 will now be summarized with reference to FIG. 6. This figure illustrates certain system and converter parameters for several different operating conditions during a total period of time that extends over 1.5 cycles of the alternating voltage $V_s$ (FIG. 6a) of the a-c system. During this period the fundamental frequency of $V_s$ is assumed normal and constant, and consequently the angle of the reference signal $\theta_s$, which is proportional to the time integral of the system frequency, increases at a constant rate as is depicted in FIG. 6b.

Let it first be assumed that at time $t_0$ in FIG. 6 the converter is operating in a steady state rectifying mode with its valves being fired in their usual sequence at a desired constant firing angle that is slightly under $\beta_{MAX}$ (FIG. 6g). At this time both the input signal 61 and the limit signal 67 are zero (FIGS. 6c and 6d), and consequently the control signal is also zero and the frequency determining voltage $F_c$ equals the bias signal $F_b$ (FIG. 6e). So long as this condition continues, the voltage controlled oscillator 51 runs at a constant frequency which is precisely 12 times the frequency of $V_s$, and successive pulses from its clock (FIG. 6f) are equally spaced at intervals of 30° with respect to a cycle of $V_s$. As was previously explained, the time between pulses is determined by the magnitude of $F_c$, each pulse being timed from the preceding one and being generated as soon as the integral of $F_c$ attains a predetermined constant volt-seconds which in FIG. 6e is shown as the area "A" under $F_c$ between pulse 1 and 2 of the oscillator. While $F_c$ remains constant, the oscillator frequency is constant and the angle of the firing signal feedback signal $\theta_c$, being proportional to the time integral of that frequency, increases at the same rate as the system angle (FIG. 6b). Thus the magnitude of $\beta$, which varies with the phase displacement between $\theta_c$ and $\theta_s$, remains constant.

Just after the fourth clock pulse in FIG. 6, the input signal 61 is assumed to be given a stepped negative increase to the finite magnitude which is shown in FIG. 6c at time $t_1$. The control signal follows suit, and consequently the frequency determining voltage $F_c$ is reduced as indicated in FIG. 6e. The operating frequency of the voltage controlled oscillator 51 is now correspondingly reduced. This will delay the succeeding clock pusle 5 (FIG. 6f), thereby retarding the next valve firing. The rate of change of the angle feedback signal 63 (FIG. 6g) depends on the magnitude of the control signal $F_\epsilon$, and the amount it changes is a function of the time integral of this quantity. At time $t_2$ it is assumed that the input signal 61 and hence the control signal $F_\epsilon$ are returned to zero, whereupon $F_c$ increases to once again equal $F_b$. When the next clock pulse 5 occurs, the time since the preceding pulse 4 will have been extended beyond 30° by an incremental interval of approximately 60°, and the firing angle of the converter will be correspondingly retarded (decreased) to a new value only slightly greater than 90°. Beginning with pulse 5, the oscillator resumes generating pulses at equal intervals of 30° and $\beta$ will remain constant at its new value until there is a further change in $F_c$.

At a later time $t_3$, it is assumed that the input signal 61 is given another stepped negative increase to an even larger finite magnitude which results in a negative control signal equal to $F_b$. Consequently $F_c$ is now reduced to zero (FIG. 6e), as is the frequency of the voltage controlled oscillator 51. This causes $\beta$ to decrease at its maximum rate, and it soon intercepts $\beta_{MIN}$. At this time ($t_4$) the clamp 64 responds to the angle feedback signal 63 going beyond the minimum limit 65 by producing a positive limit signal 67 (FIG. 6d) whose magnitude is at least large enough to counteract the negative input signal 61 and thereby reduce $F_\epsilon$ to zero and allow $F_c$ to return to the level of $F_b$ which locks the oscillator frequency to the system frequency. For as long as the input signal tends to cause deviation of $\beta$ beyond $\beta_{MIN}$, the limit signal will continue to influence $F_\epsilon$ as necessary to keep the oscillator operating at the proper frequency to minimize further excursion of $\beta$ outside its preset range of permissible variation. By thus regulating the oscillator frequency, the desired equality of intervals or spaces between consecutive valve firings is maintained whenenver the firing time computer is operating against a limit.

When the converter is operating in an inverting mode, the regulator which supplies the input signal is assumed to be functioning normally in a margin angle regulating mode. Consequently soon after time $t_4$ the negative input signal 61 begins to decrease. As it does so, the limit signal 67 tapers off to zero as shown in FIG. 6d. Since at this time there is a lower than ordered margin angle, the input signal 61 swings positive and the converter frequency rises above the steady state value $F_b$ as shown in FIG. 6e. This causes $\beta$ to advance toward an in-range value that will bring the actual magnitude of the margin angle into agreement with the desired magnitude. The firing signal that is produced by the next clock pulse after the input signal returns to zero (pulse 9 in FIG. 6f) will be properly phased in relation to the alternating voltage to effect a valve firing at a correct firing angle. In subsequent steady state operation, $F_c$ remains equal to $F_b$, the oscillator runs at its constant frequency of 12 times system frequency, and the converter valves are fired at a desired constant firing angle that is slightly over $\beta_{MIN}$.

As was mentioned hereinabove, the bipolar input signal 61 that is supplied to the control signal deriving means 60 is preferably determined by an error signal which reflects the difference between actual and desired magnitudes of a selected system quantity. The source of the error signal is the regulator 80. As can be seen in FIG. 3, the regulator 80 comprises a mode selector section and an amplifier section. The mode selector section provides the error signal 81 whose magnitude and relative polarity depend on the difference, if any, between orders from the master controls 43 and responses which are fed back to the terminal 47 from the converter itself and/or from the power system. The error signal 81 is coupled to a summing point 82 in the amplifier section of the regulator where it is added to signals from certain other sources 48 and 101 whose purposes will be explained below. The sum of these signals is then amplified by an op amp 83 whose output becomes the previously indentified input signal 61. Whenever the error signal 81 varies from zero, corresponding changes are effected in the input signal 61 and hence in the control signal $F_\epsilon$, thereby transiently increasing or decreasing $F_c$ and consequently the frequency of the voltage controlled oscillator 51 so as to advance or to retard the firing angle to a correct value that brings the responses into agreement with the orders and thus reduces the error signal 81 to zero.

In accordance with my invention, the normal magnitude of the frequency determining voltage $F_c$ tracks the fundamental frequency of the alternating voltage of the a-c system, thereby changing the frequency of the voltage controlled oscillator 51 as necessary to keep it running at 12 times the fundamental frequency of the system in the event the latter changes. In the illustrated embodiment of the invention, this is accomplished by providing compensating means effective whenever the actual system frequency is not 60 Hz for influencing the control signal $F_\epsilon$ so as to modify the magnitude of $F_c$ in the proper sense to lock the oscillator frequency to system frequency, whereby the firing signals 31–36 are kept synchronized with system voltage. Preferably the compensating means is located in the amplifier section of the regulator 80 and comprises an automatic bias circuit 101.

The automatic bias circuit 101 is suitably constructed and arranged so as to add to the error signal 81 a compensating signal 102 whose magnitude is the time integral of the error signal. A non-inverting op amp integrator is useful for this purpose. The integrator time constant is relatively long, typically in the range of 1 to 10 seconds. The magnitude and the polarity of the compensating signal 102 will therefore reflect any cumulative error over a period of many cycles of alternating voltages. The signal 102 is passed on in turn through the input signal 61 and the control signal $F_\epsilon$ to the signal generator 50 where it provides a steady state offset in the frequency determining voltage $F_c$, relative to the preselected bias signal $F_b$, of proper value to ensure that the oscillator 51 runs in harmonic synchronism with the a-c power system in the absence of any error signal 81 or limit signal 67. The compensating signal tends to be zero so long as the fundamental system frequency remains equal to 60 Hz.

Figure 5:
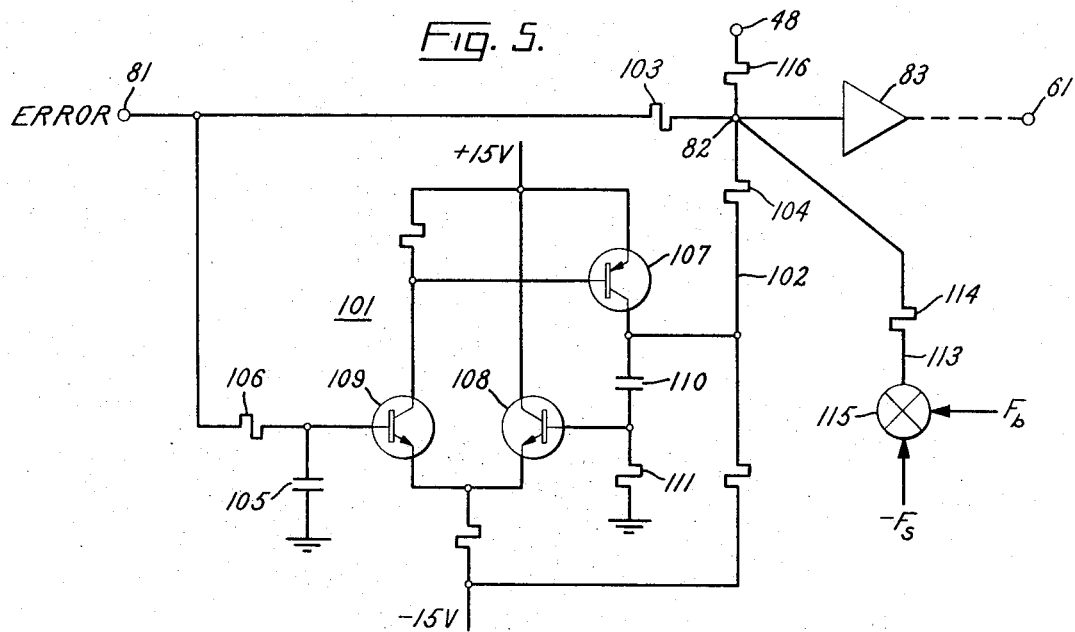
FIG. 5 is a schematic circuit diagram of the self-adjusting automatic bias circuit shown in block form in FIG. 3.

In one practical embodiment of my invention I have used the circuit shown in FIG. 5 for the automatic bias circuit 101. As is shown in FIG. 5, the error signal 81 is coupled directly through an input resistor 103 to the summing point 82 and indirectly through the circuit 101 and another resistor 104 to the same point. In the circuit 101 the error signal is integrated by a capacitor 105 having one plate grounded and the other connected via a resistor 106 to the error signal terminal. The compensating signal 102 is derived from the voltage across the integrating capacitor 105 by means of a plurality of transistors 107, 108, 109 and associated components which are interconnected and arranged to form a high-gain non-inverting amplifier. Supply voltage for the amplifier is provided by a pair of d-c buses of relatively positive and negative potential, respectively (e.g., +15 volts and −15 volts). As can be seen in FIG. 5, the collector of the transistor 107 is coupled to the base of the transistor 108 by a feedback network comprising a capacitor 110 and a resistor 111. The transfer function of the input network 105, 106 of the amplifier is of the form $(1/1 + \tau_1 s)$. The transfer function of the feedback network 110, 111 is of the form $(\tau_2 s/1 + \tau_2 s)$. Since the open loop voltage gain is high, it can be assumed that the base voltages of the two transistors 108 and 109 are very nearly equal. Thus:

$$(1/1 + \tau_1 s) V_{81} = (\tau_2 s/1 + \tau_2 s) V_{102}.$$

The components 105, 106, 110, and 111 are chosen such that $\tau_1 = \tau_2$, and therefore the transfer function of the illustrated circuit 101 is that of a pure non-inverting integrator: $(v_{102}/V_{81}) = (1/\pi_2 s)$. The same result could be achieved by using an operational amplifier, or by using a conventional inverting integrator in tandem with a simple inverting stage.

In certain power delivery systems where frequency deviations from normal may be relatively frequent and severe, it will be desirable to add further compensating means having the same effect as the automatic bias circuit 101 without requiring any error in the quantities being regulated. For this purpose, as is illustrated by way of example in FIG. 5, there is added to the summing point 82 another compensating signal 113 which reflects the difference or error between the actual and the normal fundamental frequencies of the alternating voltage of the a-c network. The previously described tachometer output signal $F_s$ and bias signal $F_b$ can be used for this purpose, and in FIG. 5 they are shown supplied to summing means 115 whose output is coupled through a resistor 114 to the summing point 82. Alternatively, instead of applying the frequency error signal 113 to the summing point 82 in the regulator 80, the desired compensation could be obtained by supplying the tachometer output signal $F_s$ to the summing means 53 in the signal generator 50 (FIG. 3) in lieu of the bias signal $F_b$.

FIG. 5 shows that the summing point 82 of the amplifier section of the regulator is also coupled, via a resistor 116, to a terminal 48. The terminal 48 is intended to be connected to a fast responding volt-second pulse generating means (not shown) which is effective when the margin angle of the converter is being regulated to inject an appropriate signal for rapdily advancing the firing angle in response to a severe change in the minimum margin angle. Such pulse generating means is disclosed and claimed in U.S. Pat. No. 3,771,041 granted to P. Chadwick and assigned to the General Electric Co., and its function and advantages are fully explained in the referenced patent.

As was explained hereinbefore, the error signal 81 represents the difference between actual and desired magnitudes of a selected quantity of the system or of the converter. Current, voltage, or margin angle are quantities that are usually selected for regulation. The mode selector section of the regulator 80 can incorporate suitable means for making a selection among the alternative quantities to be regulated. In addition to the conventional quantities mentioned above, $\beta_{MIN}$ and $\beta_{MAX}$ modes of regulation are provided. In accordance with the present invention, the $\beta_{MAX}$ mode is practiced by deriving an error signal 81 which is a function of the deviation between a valve firing angle and the maximum limit of the firing angle, whereby $\beta$ is regulated to a desired constant value which is the same or nearly the same as $\beta_{MAX}$.

In this aspect of my invention, firing angle regulation is obtained by supplying the regulator 80 with a reference signal 66' which is determined by the same control circuit means 46 that establishes the preset maximum limit 66 in the above-described overriding clamp 64, and with a feedback signal 94 which varies with $\beta$. Preferably the latter signal is taken from the beta monitor 62 and hence corresponds to the actual magnitude of the negative angle feedback signal 63. As is shown in FIG. 3, both of the signals 66' and 94 are coupled to summing means 84 in the regulator 80, and their algebraic sum is amplified by a high-gain op amp 85 which is shunted by a stabilizing feedback circuit 86. Therefore the output of the amplifier 85, which is the error signal 81, has a magnitude and a relative polarity that depends on the amount and the sense of any deviation between the actual magnitude of the angle feedback signal 63 and a desired magnitude determined by the preset maximum limit 66. This error signal, after amplification by the amplifier section of the regulator 80, determines the input signal 61 to the control signal deriving means 60 of the firing time computer 28. In a manner previously explained, the control signal responds to input signal variations by effecting corrective operation of the signal generator 50 which changes $\beta$ as necessary to reduce the error signal to zero.

In a case where duplicate beta monitors are provided (as in some 12-pulse converters) the firing angle response 94 that is fed back to the regulator 80 preferably has a typical value determined by a beta selector 95 (see FIG. 3) from among the signal 63 which is produced by the local monitor 62 and any other angle feedback signals 96 produced by the other monitors. In a 24-pulse converter, the summing means 68 of the illustrated controls can be additionally supplied with a beta balance signal (not shown) which correctively adjusts the control signal $F_\epsilon$ in response to the detection of an error between the firing angle responses of the two pairs of bridges.

The above-described $\beta_{MAX}$ mode of regulation is particularly advantageous during certain prolonged abnormal operating conditions. One of these conditions is when other orders or other responses are conditioning the firing time computer to operate against the $\beta_{MAX}$ limit for an extended period of time. In this event, it is preferable to have the firing angle controlled by regulator 80 rather than by the overriding clamp 64. Otherwise an improper compensating signal 102 might develop. Accordingly, the regulator includes bias means 87 for adding to the summing means 84 a small negative signal 88 that opposes the reference signal 66' so as to reduce the desired magnitude of the feedback signal 94, compared to the preset limit 66, by a fixed magnitude which is representative of a relatively small angular margin (e.g., 4 to 6°). As a result, zero error is obtained whenever $\beta$ has an actual value slightly less than $\beta_{MAX}$. This margin will remain constant as $\beta_{MAX}$ is varied over a wide range. The regulator action is always backed up by faster-responding overriding clamp 64 in the event of any sudden increase of $\beta$ above its desired value.

Another circumstance in which the firing angle mode of regulation is useful is when the converter is not running, that is, when the firing signal logic blocks activation of the valve firing system 20 by the firing signals 31-36 so that no valve firings are taking place. To start the converter, a scheme such as is disclosed and claimed in U.S. Pat. No. 3,648,147-Leete should be used, and the arrangement shown in FIG. 3 of my present application is well suited for implementing such a starting scheme. Before the converter is started, the firing time computer idles with a predetermined initial firing angle. The control circuit means 46 is programmed to establish this initial angle and subsequently, during the starting process, to progressively vary $\beta_{MAX}$ according to the teachings of Leete.

A $\beta_{MIN}$ mode of regulation is also contemplated. In arrangement and operation it is the same as the $\beta_{MAX}$ regulation described hereinbefore, with two modifications. Instead of the reference signal 66', a reference signal derived from the preset beta minimum limit signal 65 would be supplied to the summing means 84 in the regulator 80; and the small signal 88 from the bias means 87 would be positive instead of negative so as to increase the desired magnitude of the feedback signal 94, compared to the minimum limit 65, by a small angular margin of from 4 to 6°. Accordingly, when this mode is operative the error signal 81 will be a function of the deviation between a valve firing angle and the minimum limit thereof, whereby $\beta$ is regulated to a desired constant value which is slightly larger than $\beta_{MIN}$. This mode of regulation is useful at the inverter terminal of an HVDC power delivery system following prolonged bypass operation or while experiencing sustained outputs from the commutating voltage distortion detector which is connected to the terminal 45. In either case, with the $\beta_{MIN}$ mode of regulation, a large bias signal 102 would be developed, thereby leading to a substantial margin angle error after returning to the margin angle mode of regulation.

Figure 7:
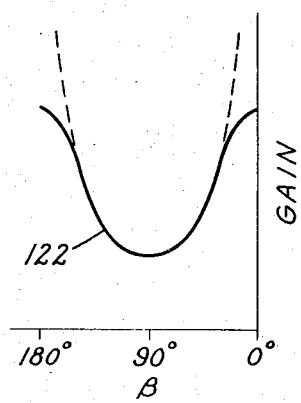
FIG. 7 is a graph of the gain vs. firing angle characteristic of the optional linearization means shown in block form in FIG. 3.

In accordance with an optical feature of the present invention, the connection between the regulator 80 and the control signal deriving means 60 of the firing time computer 28 can include a variable gain amplifier 120 for linearizing the regulating action. The gain of this linearization means 120 is modulated by the angle feedback signal 63 which is applied to a terminal 121 of the means 120. This optional linearization means 120 is suitably constructed to have the tranfer function shown by the curve 122 in FIG. 7. The cruve 122 is intended to follow the cosecant of $\beta$ with modifications near 0° and 180° as shown. This compensates approximately for variations of gain with $\sin\beta$ that are inherent in the converter control loop when operating in either a current or a d-c voltage regulating mode. The resulting constancy of forward loop gain over nearly the full range of $\beta$ variations will simplify the design of the various stabilizing networks for the current and voltage modes. Alternatively, the linearization means could have a parabolic transfer function, in which case its gain would vary with the square of ($\beta - 90°$).

While I have shown and described the preferred form of my invention by way of illustration, further modifications will occur to those skilled in the art. I therefore contemplate by the claims which conclude this specification to cover all such modification as fall within the true spirit and scope of my invention.

What I claim as new and desire to secure by Letters Patent of United States is:

1. In an electric power delivery system comprising a plurality of controllable electric valves connected between two sets of power conductors, at least one of said sets being assocaited with a polyphase alternating voltage network, said valves being cyclically fired in a predetermined sequence and at firing angles which can be varied to control the flow of power between said sets of conductors, improved means for determining said firing angles comprising:

a. a source of a variable bipolar control signal;
b. means responsive to said control signal for producing during each cycle of alternating voltage a family of periodic output signals whose timing, relative to recurrent reference points in said cycle, is characterized by a variable electrical angle beta ($\beta$), said output signal producing means being so constructed and arranged that when said control signal is zero and said alternating voltage has a predetermined fundamental frequency the magnitude of $\beta$ is constant and when said control signal has a finite magnitude and said alternating voltage has said predetermined fundamental frequency the magnitude of $\beta$ is changing at a rate that depends on the control signal magnitude and in a sense that depends on its polarity;
c. means activated by the respective output signals of said family for firing said valves in sequence;
d. means for producing an angle feedback signal whose magnitude is representative of $\beta$; and
e. clamp means coupled to said source and responsive to said angle feedback signal for influencing said control signal as a function of any deviation of said feedback signal above a preset maximum limit or below a preset minimum limit, said minimum limits thereby establishing a range in which $\beta$ is permitted to vary.

2. The improvement of claim 1 in which said feedback signal producing means is so constructed and arranged that the magnitude of the angle feedback signal varies with the predicted magnitude of $\beta$ for each consecutive output signal that will in turn cause the next valve firing in said sequence, and said clamp means is operative in response to deviations of said feedback signal beyond said preset limits to influence said control signal in a sense that regulates the operation of said output signal producing means as necessary to minimize excurison of $\beta$ outside said permissible range.

3. The improvement of claim 1 in which said source includes means for deriving a variable input signal which depends on the error, if any, between a valve firing angle and a desired angle which is established by a predetermined one of said preset limits, said control signal responding to input signal variations by effecting corrective operation of said output signal producing means which changes $\beta$ as necessary to reduce said error to zero.

4. The improvement of claim 3 in which said input signal deriving means responds to the difference between the actual magnitude of said angle feedback signal and a desired magnitude that is determined by said predetermined one limit.

5. The improvement of claim 4 in which said predetermined one limit comprises said preset maximum limit.

6. The improvement of claim 5 in which said desired magnitude differs from said preset maximum limit by a fixed magnitude which is representative of a relatively small angular margin, said margin ensuring that said desired angle is less than the maximum permissible $\beta$.

7. The improvement of claim 1 in which said output signal producing means includes an oscillator whose frequency of operation varies with the magnitude of a frequency determining signal supplied thereto, the operating frequency of said oscillator determining the frequency of said output signals and hence the frequency of the respective valve firings, means for supplying said oscillator with said frequency determining signal whose normal magnitude causes the oscillator to operate at a frequency which is a predetermined harmonic of the fundamental frequency of said alternating voltage, and means for increasing or decreasing the magnitude of said frequency determining signal according to the value of said control signal.

8. The improvement of claim 7 in which said feedback signal producing means is so constructed and arranged that the magnitude of the angle feedback signal varies with the predicted magnitude of $\beta$ for each consecutive output signal that will in turn cause the next valve firing in said sequence, and said clamp means is operative in response to deviations of said feedback signal beyond said preset limits to influence said control signal in a sense that regulates the frequency of said oscillator as necessary to minimize excursion of $\beta$ outside said permissible range.

9. The improvement of claim 7 in which said control signal is derived from a bipolar error signal which depends on the difference between actual and desired magnitudes of a selected quantity of the system, and in which compensating means is provided for varying the normal magnitude of said frequency determining signal with variations in the actual fundamental frequency of said alternating voltage so as to keep said output signals synchronized with the alternating voltage whenever said error signal is zero.

10. The improvement of claim 7 in which said control signal is derived from a bipolar input signal which depends on the difference between actual and desired mangitudes of a selected quantity of the system.

11. The improvement of claim 10 in which said source comprises means for algebraically summing said input signal and a limit signal which said clamp means supplies in response to deviation of said feedback signal beyond said preset limits, said limit signal being proportional in magnitude to the amount of said deviation and influencing said control signal and hence said frequency determining signal in a sense that regulates the oscillator frequency as necessary to minimize excursion of $\beta$ outside said permissible range.

12. The improvement of claim 10 including means for providing a bias signal of preselected magnitude, said frequency determining signal comprising the algegraic sum of said control signal and said bias signal, said bias signal being effective when said control signal is zero to cause the oscillator to operate at a frequency which is said predetermined harmonic of said predetermined fundamental.

13. The improvement of claim 12 in which said source additionally comprises compensating means for influencing said control signal so as to ensure that said frequency determining signal has a proper magnitude to keep said output signals synchronized with said alternating voltage whenever the actual fundamental frequency of said alternating voltage differs from said predetermined fundamental frequency and the actual magnitude of said selected quantity equals said desired magnitude.

14. The improvement of claim 1 in which said source comprises means for algebraically summing a variable bipolar input signal and a limit signal which said clamp means supplies in response to said angle feedback signal being beyond said limits, said control signal being representative of the sum of said input and limit signals.

15. The improvement of claim 14 in which said input signal is derived from a bipolar error signal which depends on the difference between actual and desired magnitudes of a selected quantity of the system, and in which compensating means is provided for ensuring that so long as said limit and error signals are zero said control signal has a proper magnitude to keep $\beta$ constant whenever the actual fundamental frequency of said alternating voltage differs from predetermined fundamental frequency.

16. The improvement of claim 15 in which said compensating means comprises means for adding to said error signal a signal whose magnitude is the time integral of said error signal, said input signal being dependent on the sum of said error signal and its integral.

17. The improvement of claim 16 in which said compensating means includes additional means for adding to said error signal a compensating signal which depends on the difference between the actual fundamental fequency of said alternating voltage and said predetermined fundamental frequency, said input signal being dependent on the sum of said compensating signal, said error signal, and the integral of said error signal.

18. The improvement of claim 1 in which said source includes means for deriving an error signal which depends on the difference between actual and desired magnitudes of a selected quantity of the system and variable gain means for amplifying said error signal, said control signal responding to variations in the amplified error signal by regulating the operation of said output signal producing means as necessary to shift $\beta$ to a value that results in zero error, the gain of said amplifying means being varied as an appropriate function of said angle feedback signal to linearize the regulating action.

19. The improvement of claim 18 in which said gain varies as approximately the cosecant of $\beta$.

* * * * *